(12) United States Patent
Bowman et al.

(10) Patent No.: US 8,783,333 B1
(45) Date of Patent: Jul. 22, 2014

(54) COOLING SYSTEM

(75) Inventors: John K. Bowman, Brighton, MA (US); Stephen J. Keefe, Boylston, MA (US)

(73) Assignee: EMC Corporation, Hopkinton, MA (US)

( * ) Notice: Subject to any disclaimer, the term of this patent is extended or adjusted under 35 U.S.C. 154(b) by 603 days.

(21) Appl. No.: 12/638,673

(22) Filed: Dec. 15, 2009

(51) Int. Cl.
*H05K 7/20* (2006.01)
*F28D 15/00* (2006.01)
*F28F 7/00* (2006.01)

(52) U.S. Cl.
USPC .......... 165/104.21; 165/104.33; 165/185; 165/80.1; 361/700

(58) Field of Classification Search
USPC .......... 165/10, 80.2–80.5, 104.21, 104.26, 165/104.33, 185; 361/700, 705, 707, 708
See application file for complete search history.

(56) References Cited

U.S. PATENT DOCUMENTS

| | | | |
|---|---|---|---|
| 5,398,748 A * | 3/1995 | Yamaji et al. | 165/80.2 |
| 6,834,712 B2 * | 12/2004 | Parish et al. | 165/104.26 |
| 7,106,595 B2 * | 9/2006 | Foster et al. | 361/721 |
| 7,151,668 B1 * | 12/2006 | Stathakis | 361/700 |
| 2006/0056154 A1 * | 3/2006 | Foster et al. | 361/700 |
| 2008/0062652 A1 * | 3/2008 | Lieberman et al. | 361/715 |
| 2008/0251911 A1 * | 10/2008 | Farnsworth et al. | 257/714 |
| 2008/0264613 A1 * | 10/2008 | Chu | 165/104.33 |
| 2009/0190303 A1 * | 7/2009 | Chu et al. | 361/679.47 |
| 2010/0053867 A1 * | 3/2010 | Ellis et al. | 361/679.03 |
| 2011/0209855 A1 * | 9/2011 | Peterson et al. | 165/104.26 |

* cited by examiner

*Primary Examiner* — Brandon M Rosati
*Assistant Examiner* — Jon T Schermerhorn
(74) *Attorney, Agent, or Firm* — Brian J. Collandreo; Mark H. Whittenberger; Holland & Knight LLP

(57) ABSTRACT

A cooling system includes an evaporator assembly configured to thermally contact one or more memory modules and absorb thermal energy from the one or more memory modules. A condenser assembly is thermally coupled to the evaporative assembly and configured to receive and dissipate at least a portion of the thermal energy absorbed by the evaporative assembly.

18 Claims, 4 Drawing Sheets

COOLING SYSTEM

TECHNICAL FIELD

This disclosure relates to cooling systems and, more particularly, to cooling system for use with circuit assemblies.

BACKGROUND

As computing systems become more powerful and clocking speeds increase, the various electronic components included within the systems generate considerably more heat. Further complicating matters is that the various electronic components are becoming smaller, thus allowing system boards to be more densely packed with electronic components. Traditional cooling systems often utilized fans to move air across the devices in need of cooling. Unfortunately, such cooling systems are often thermally insufficient.

SUMMARY OF DISCLOSURE

In one implementation, a cooling system includes an evaporator assembly configured to thermally contact one or more memory modules and absorb thermal energy from the one or more memory modules. A condenser assembly is thermally coupled to the evaporative assembly and configured to receive and dissipate at least a portion of the thermal energy absorbed by the evaporative assembly.

One or more of the following features may be included. The cooling system is a heatpipe cooling system. One or more tubing assemblies may be configured to thermally couple the evaporator assembly with the condenser assembly. A cooling fluid may be configured to be at least partially evaporated within the evaporator assembly and at least partially condensed within the condenser assembly. The cooling fluid may be chosen from the group consisting of water, ethanol, acetone, sodium, and mercury. The evaporator assembly may include one or more thermally-conductive deflectable members configured to extend from a surface of the evaporator assembly and contact a surface of the one or more memory module. The memory module may be an inline memory module.

In one implementation, a cooling system includes an evaporator assembly configured to thermally contact one or more heat-producing devices and absorb thermal energy from the one or more heat-producing devices. A condenser assembly is thermally coupled to the evaporative assembly and configured to receive and dissipate at least a portion of the thermal energy absorbed by the evaporative assembly. The evaporator assembly includes one or more thermally-conductive deflectable members configured to extend from a surface of the evaporator assembly and contact a surface of the one or more heat-producing devices.

One or more of the following features may be included. The cooling system may be a heatpipe cooling system. One or more tubing assemblies may be configured to thermally couple the evaporator assembly with the condenser assembly. A cooling fluid may be configured to be at least partially evaporated within the evaporator assembly and at least partially condensed within the condenser assembly. The cooling fluid may be chosen from the group consisting of water, ethanol, acetone, sodium, and mercury. The one or more heat-producing devices may be chosen from the group consisting of: a memory module, a processor assembly, an integrated circuit assembly, an electro-mechanical storage device, and a solid state storage device. The memory module may be an inline memory module.

In one implementation, a cooling system includes an evaporator assembly configured to thermally contact one or more memory modules and absorb thermal energy from the one or more memory modules. A condenser assembly is thermally coupled to the evaporative assembly and configured to receive and dissipate at least a portion of the thermal energy absorbed by the evaporative assembly. One or more tubing assemblies are configured to thermally couple the evaporator assembly with the condenser assembly. The evaporator assembly includes one or more thermally-conductive deflectable members configured to extend from a surface of the evaporator assembly and contact a surface of the one or more memory modules.

One or more of the following features may be included. The cooling system may be a heatpipe cooling system. A cooling fluid may be configured to be at least partially evaporated within the evaporator assembly and at least partially condensed within the condenser assembly. The cooling fluid may be chosen from the group consisting of water, ethanol, acetone, sodium, and mercury. The memory module may be an inline memory module.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
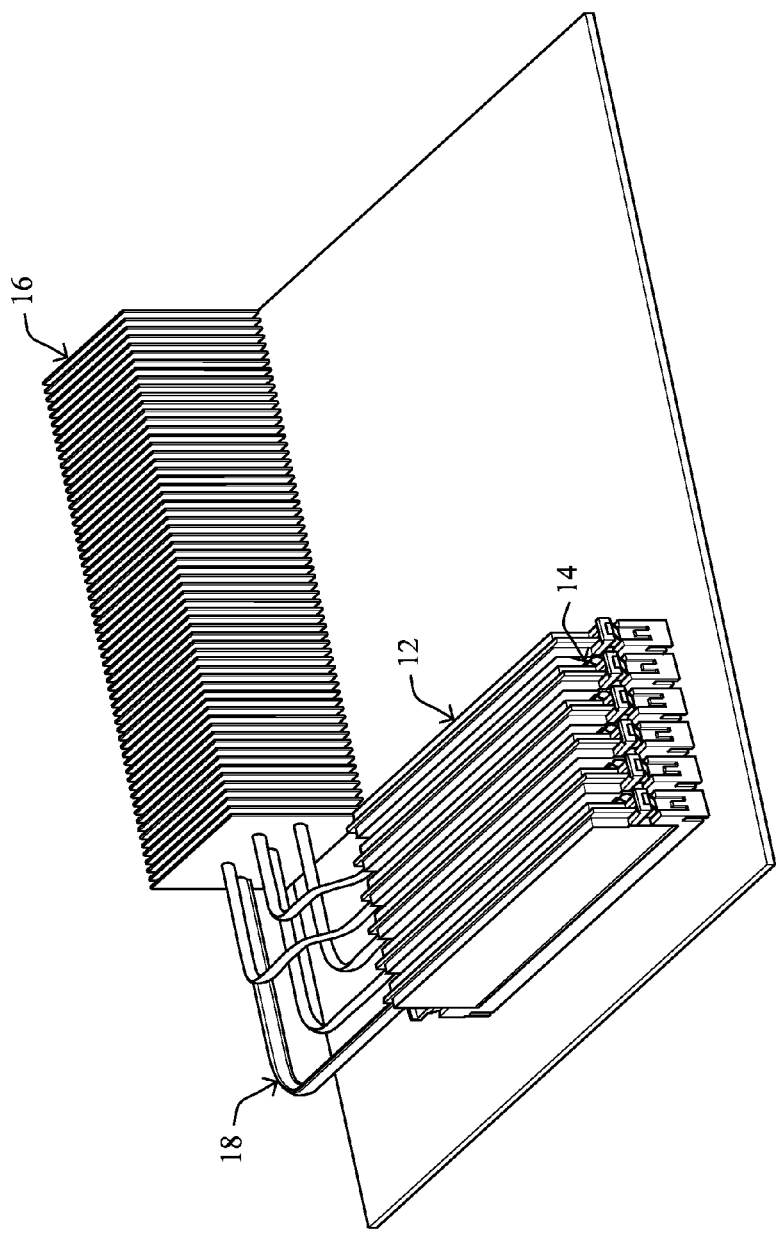
FIG. 1 is a isometric view of a cooling system thermally coupled to a plurality of memory modules.
Figure 2:
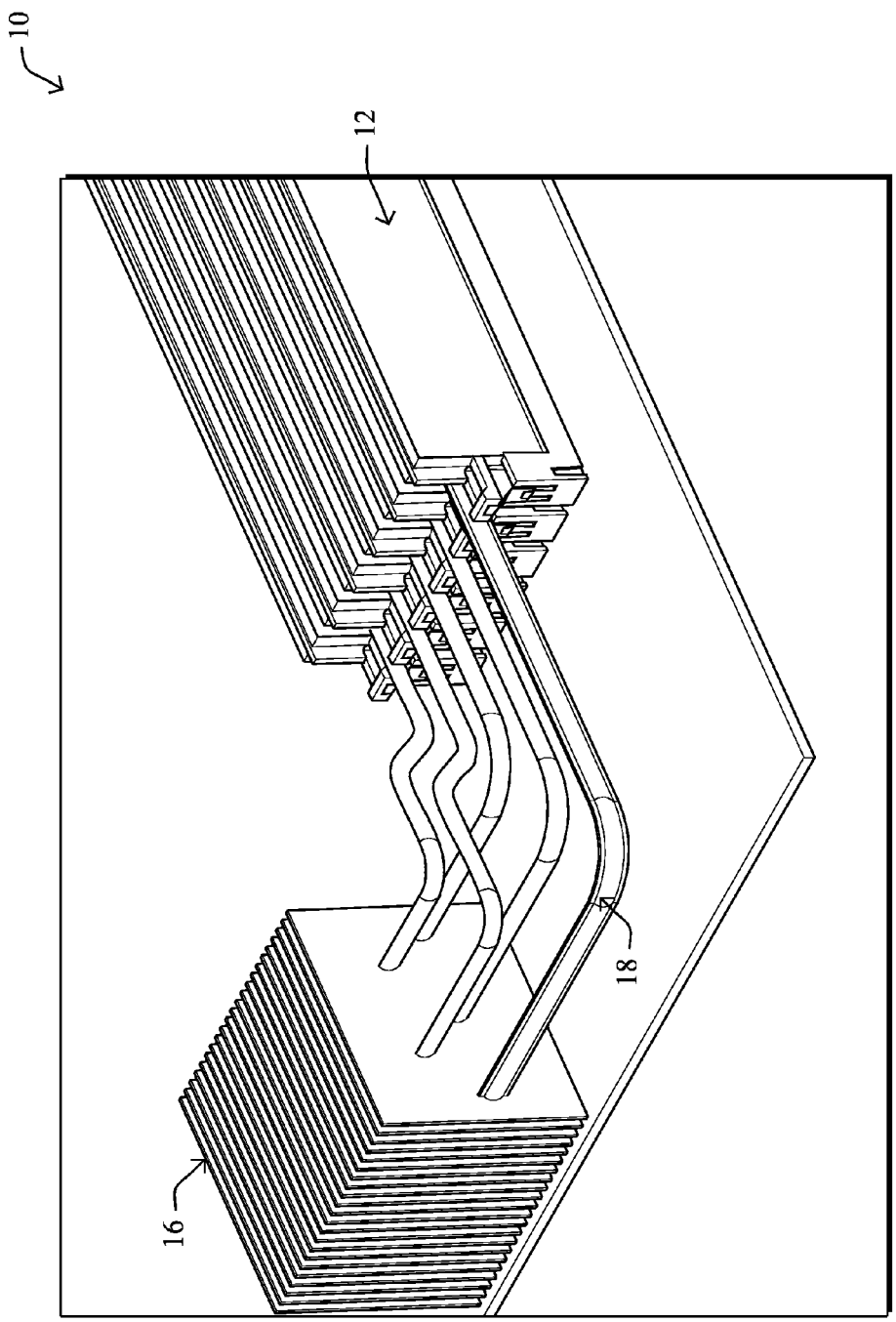
FIG. 2 is another isometric view of the cooling system of FIG. 1.
Figure 3:
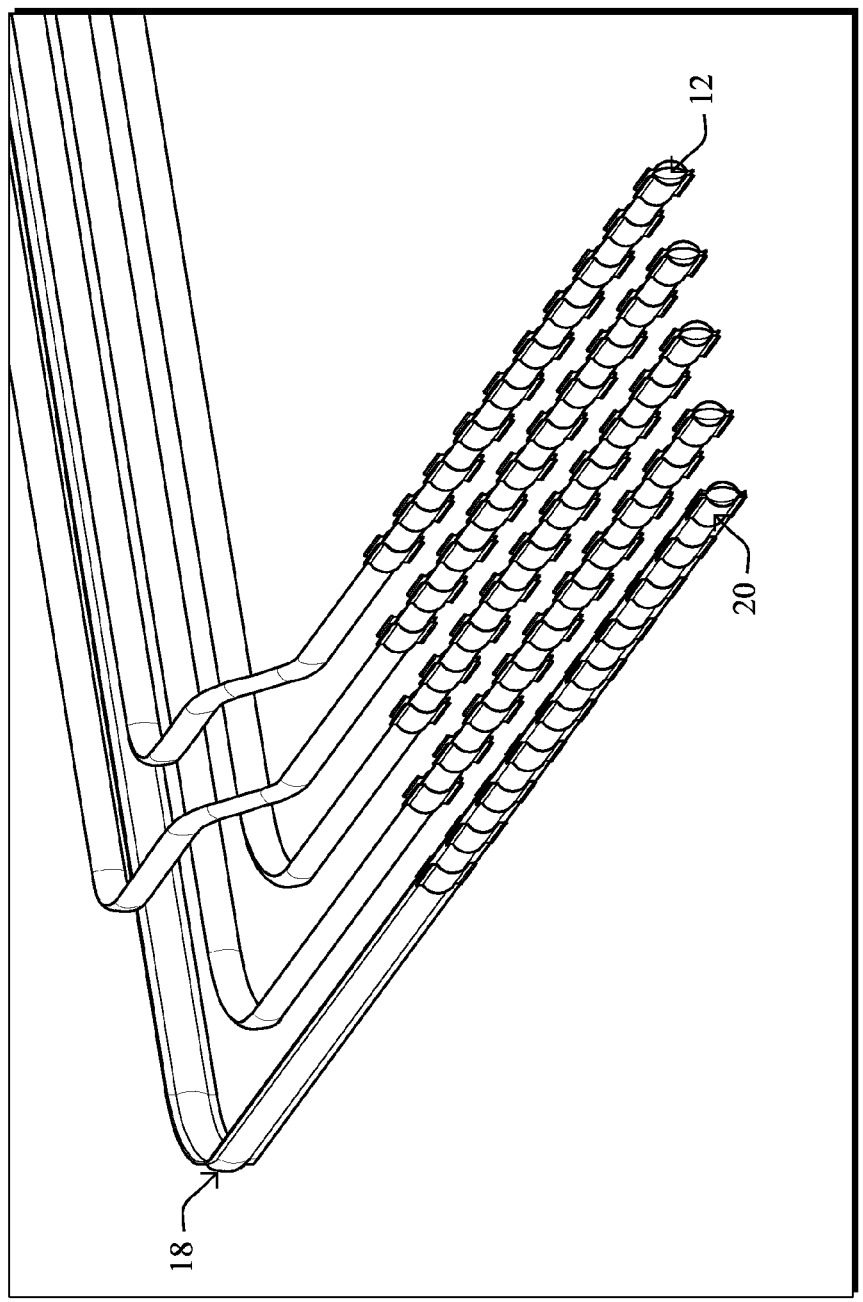
FIG. 3 is another isometric view of the cooling system of FIG. 1.
Figure 4:
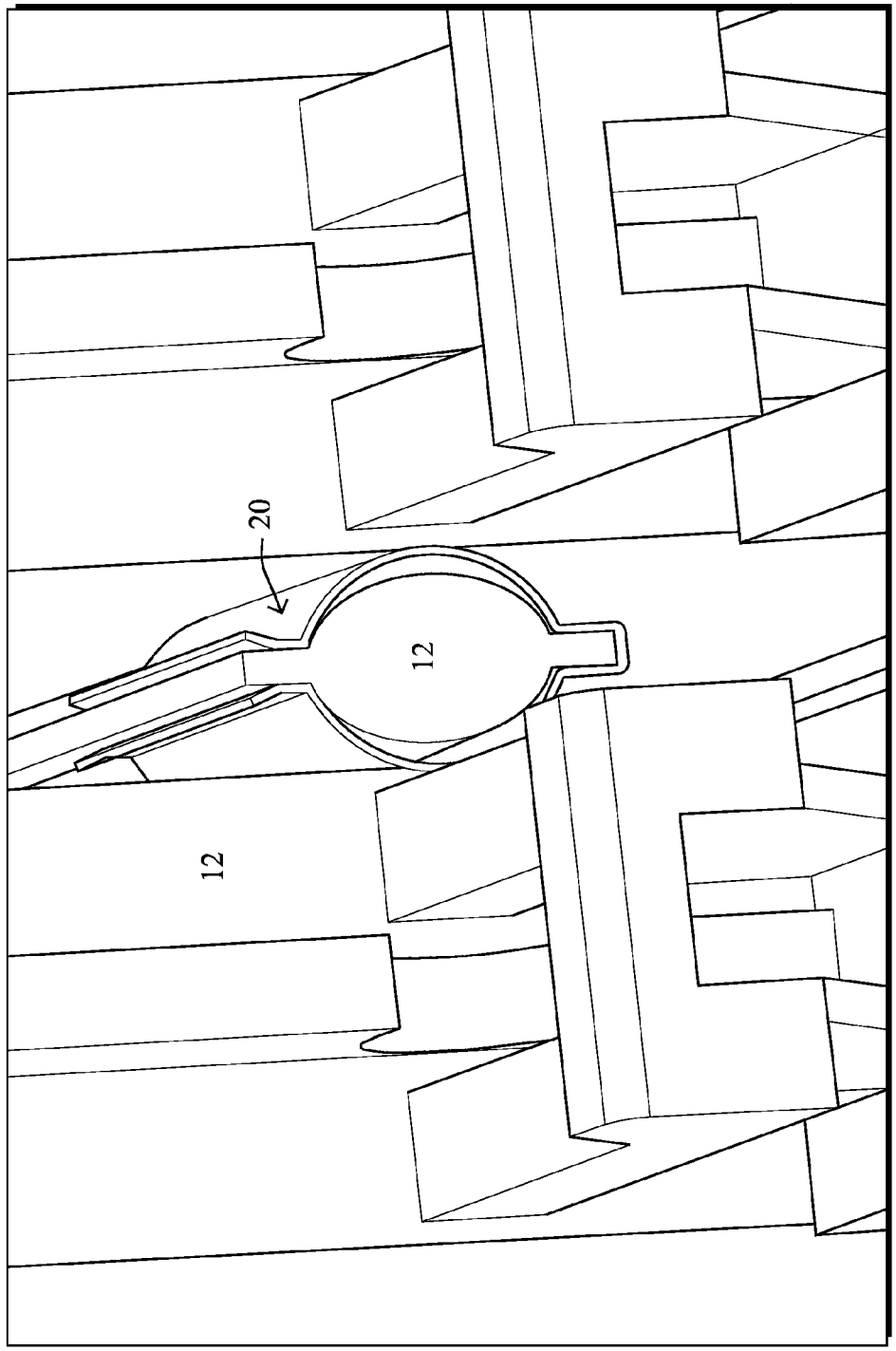
FIG. 4 is another isometric view of the cooling system of FIG. 1.

System Overview:

Referring to FIGS. 1-4, there is shown cooling system 10 that may be used to cool one or more heat-producing devices. Examples of such heat producing devices may include but are not limited to: memory modules (e.g., inline memory module 12), processor assemblies (e.g., microprocessor assemblies; not shown), integrated circuit assemblies (e.g., memory controllers, hard drive controllers, network controllers; not shown), electro-mechanical storage device (e.g., hard disk drives; not shown), and a solid state storage device (e.g., flash memory based drives; not shown).

Cooling system 10 may include evaporator assembly 14 configured to thermally contact one or more heat-producing devices e.g., memory modules 12, processor assemblies (not shown), and integrated circuit assemblies (not shown) and absorb thermal energy from the heat-producing devices. Cooling system 10 may include condenser assembly 16 that is thermally coupled to evaporative assembly 14 and configured to receive and dissipate at least a portion of the thermal energy absorbed by evaporative assembly 14. Cooling system 10 may include one or more tubing assemblies 18 that may be configured to thermally couple the evaporator assembly with the condenser assembly.

One example of cooling system 10 is a heatpipe cooling system. As is known in the art, a heatpipe cooling system is a heat transfer system that combines the principles of both thermal conductivity and matter phase transition to manage the transfer of heat between two interfaces.

At the hot interface (e.g., evaporator assembly 14) within a heat pipe, a pressurized fluid in contact with a thermally conductive solid surface may transition into a vapor by absorbing the latent heat from the heat-producing devices e.g., memory modules 12, processor assemblies (not shown), and integrated circuit assemblies (not shown). This vapor may flow through e.g., tubing assemblies 18 to condenser assembly 16 and may condense back into a liquid, releasing this latent heat. This fluid liquid may then return to evaporator assembly 14 through either capillary action or gravity action via tubing assemblies 18, where the fluid may evaporate once again and repeat the cycle.

The internal pressure of the heat pipe may be adjusted to facilitate the phase change depending on the demands of the working conditions of the thermally managed system.

Typical condenser assembly 16 and evaporator assembly 14 are constructed of a material with high thermal conductivity such as copper or aluminum. When configured as a heatpipe, a vacuum pump may be used to remove some/all of the air from cooling system 10. Cooling system 10 may then be partially filled with a cooling fluid that may be chosen to match the operating temperature. Examples of such cooling fluids may include but are not limited to water, ethanol, acetone, sodium, and mercury. Due to the partial vacuum that is near or below the vapor pressure of the cooling fluid, some of the cooling fluid may be in the liquid phase and some of the cooling fluid may be in the gas phase.

Inside of tubing assemblies 18, a wick structure (not shown) may be utilized to exert a capillary pressure on the liquid phase of the cooling fluid. Examples of such a wick structure may include but are not limited to a sintered metal powder, a series of grooves in parallel with the longitudinal axis of the pipe, or any material capable of exerting capillary pressure on the condensed liquid to wick it back to evaporator assembly 14. Alternatively, a wick structure may not be required if e.g., gravity is sufficient to overcome surface tension and allow the condensed cooling liquid to flow back to evaporator assembly 14.

Evaporator assembly 14 may include one or more thermally-conductive deflectable members (e.g., deflectable member 20) configured to extend from a surface of evaporator assembly 14 and make contact with a surface of the heat producing devices (e.g., inline memory module 12). Deflectable member 20 may be constructed of a thermally conductive material that is deflectable. An example of such a material is beryllium copper. Evaporator assembly 12 and/or deflectable member 20 may be configured make contact with a surface of the heat producing devices (e.g., inline memory module 12) proximate the warmest portion of the heat producing device. Additionally, deflectable member 20 may be configured to maximize the contact area between the heat producing device and deflectable member 20, thus enhancing the heat transfer between the heat producing device and evaporator assembly 14.

While cooling system 10 is shown above as being used to cool inline memory module 12, this is for illustrative purposes only and is not intended to be a limitation of this disclosure, as other configurations are possible. For example, cooling system 10 may be utilized to cool other electronic devices, such as microprocessors, controllers, cache memory, hard disk drives, etc.

A number of implementations have been described. Nevertheless, it will be understood that various modifications may be made. Accordingly, other implementations are within the scope of the following claims.

What is claimed is:

1. A cooling system comprising:
   an evaporator assembly configured to thermally contact a plurality of memory modules and absorb thermal energy from the plurality of memory modules; and
   a condenser assembly thermally coupled to the evaporator assembly via a plurality of tubing assemblies, wherein at least a portion of each of the plurality of tubing assemblies is located between adjacent memory modules, wherein the condenser assembly is configured to receive and dissipate at least a portion of the thermal energy absorbed by the evaporator assembly, and wherein each of the plurality of tubing assemblies include a plurality of thermally-conductive deflectable members spaced apart from one another, wherein the plurality of thermally-conductive deflectable members partially encase each of the plurality of tubing assemblies and conform to a shape of each of the plurality of tubing assemblies, wherein the plurality of thermally-conductive deflectable members separate the plurality of memory modules from directly contacting the plurality of tubing assemblies.

2. The cooling system of claim 1 wherein the cooling system is a heatpipe cooling system.

3. The cooling system of claim 1 further comprising a cooling fluid configured to be at least partially evaporated within the evaporator assembly and at least partially condensed within the condenser assembly.

4. The cooling system of claim 3 wherein the cooling fluid is chosen from the group consisting of water, ethanol, acetone, sodium, and mercury.

5. The cooling system of claim 1 wherein the plurality of thermally-conductive deflectable members are configured to contact a surface of the plurality of memory modules.

6. The cooling system of claim 1 wherein at least one of the plurality of memory modules includes an inline memory module.

7. A cooling system comprising:
   an evaporator assembly configured to thermally contact a plurality of heat-producing devices and absorb thermal energy from the plurality of heat-producing devices; and
   a condenser assembly thermally coupled to the evaporator assembly via a plurality of tubing assemblies, wherein at least a portion of each of the plurality of tubing assemblies is located between adjacent heat-producing devices, wherein the condenser assembly is configured to receive and dissipate at least a portion of the thermal energy absorbed by the evaporator assembly;
   wherein each of the plurality of tubing assemblies is partially encased in a plurality of thermally-conductive deflectable members spaced apart from one another, wherein the plurality of thermally-conductive deflectable members conform to a shape of each of the plurality of tubing assemblies;
   wherein the plurality of thermally-conductive deflectable members separate the plurality of heat-producing devices from directly contacting the plurality of tubing assemblies.

8. The cooling system of claim 7 wherein the cooling system is a heatpipe cooling system.

9. The cooling system of claim 7 further comprising a cooling fluid configured to be at least partially evaporated within the evaporator assembly and at least partially condensed within the condenser assembly.

10. The cooling system of claim 7 wherein the cooling fluid is chosen from the group consisting of: water, ethanol, acetone, sodium, and mercury.

11. The cooling system of claim 7 wherein at least one of the plurality of heat-producing devices is chosen from the group consisting of: a memory module, a processor assembly, an integrated circuit assembly, an electro-mechanical storage device, and a solid state storage device.

12. The cooling system of claim 11 wherein the memory module is an inline memory module.

13. A cooling system comprising:
   an evaporator assembly configured to thermally contact a plurality of memory modules and absorb thermal energy from the plurality of memory modules;
   a condenser assembly thermally coupled to the evaporator assembly and configured to receive and dissipate at least a portion of the thermal energy absorbed by the evaporator assembly; and
   a plurality of tubing assemblies configured to thermally couple the evaporator assembly with the condenser assembly, wherein at least a portion of each of the plurality of tubing assemblies is located between adjacent memory modules;
   wherein each of the plurality of tubing assemblies include a plurality of thermally-conductive deflectable members spaced apart from one another configured to partially encase each of the plurality of tubing assemblies, wherein the plurality of thermally-conductive deflectable members conform to a shape of each of the plurality of tubing assemblies, wherein the plurality of thermally-conductive deflectable members contact a surface of the one or more memory modules;
   wherein the plurality of thermally-conductive deflectable members separate the plurality of memory modules from directly contacting the plurality of tubing assemblies.

14. The cooling system of claim 13 wherein the cooling system is a heatpipe cooling system.

15. The cooling system of claim 13 further comprising a cooling fluid configured to be at least partially evaporated within the evaporator assembly and at least partially condensed within the condenser assembly.

16. The cooling system of claim 13 wherein the cooling fluid is chosen from the group consisting of: water, ethanol, acetone, sodium, and mercury.

17. The cooling system of claim 13 wherein at least one of the plurality of memory modules is an inline memory module.

18. The cooling system of claim 7 wherein the plurality of thermally-conductive deflectable members contact a surface of the plurality of heat-producing devices.

* * * * *